(12) United States Patent
Pease

(10) Patent No.: US 10,950,010 B2
(45) Date of Patent: Mar. 16, 2021

(54) DYNAMIC LEVELS OF DESTRUCTIVE DETAIL IN ELECTRONIC GAME DISPLAY

(71) Applicant: Square Enix Ltd., London (GB)

(72) Inventor: Timothy Pease, Emerald Hills, CA (US)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 16/248,485

(22) Filed: Jan. 15, 2019

(65) Prior Publication Data

US 2020/0226799 A1 Jul. 16, 2020

(51) Int. Cl.
| | |
|---|---|
| *G06T 11/00* | (2006.01) |
| *A63F 13/52* | (2014.01) |
| *A63F 13/53* | (2014.01) |
| *A63F 13/55* | (2014.01) |
| *A63F 11/00* | (2006.01) |
| *A63F 13/358* | (2014.01) |
| *A63F 13/77* | (2014.01) |
| *A63F 13/57* | (2014.01) |
| *G06T 13/60* | (2011.01) |

(52) U.S. Cl.
CPC ............ *G06T 11/001* (2013.01); *A63F 13/52* (2014.09); *A63F 11/00* (2013.01); *A63F 13/358* (2014.09); *A63F 13/53* (2014.09); *A63F 13/55* (2014.09); *A63F 13/57* (2014.09); *A63F 13/77* (2014.09); *A63F 2300/60* (2013.01); *G06T 11/00* (2013.01); *G06T 13/60* (2013.01)

(58) Field of Classification Search
None
See application file for complete search history.

(56) References Cited

U.S. PATENT DOCUMENTS

| | | | |
|---|---|---|---|
| 7,207,804 B2* | 4/2007 | Hersh | A61B 5/16 434/236 |
| 9,737,811 B1* | 8/2017 | Penmatsa | A63F 13/52 |
| 9,779,479 B1* | 10/2017 | Makinen | G06T 3/4092 |
| 10,565,160 B1* | 2/2020 | Gorelik | G06F 16/113 |
| 2017/0316072 A1* | 11/2017 | Persson | G06F 16/278 |

(Continued)

FOREIGN PATENT DOCUMENTS

| | | |
|---|---|---|
| JP | 2001224849 A | 8/2001 |
| JP | 2004159922 A | 6/2004 |
| JP | 2014199617 A | 10/2014 |

OTHER PUBLICATIONS

Imagire, T. et al. "A Fast Method for Simulating Destruction and the Generated Dust and Debris." The Visual Computer, vol. 25, 2009, pp. 719-727, (with English abstract).

(Continued)

*Primary Examiner* — YuJang Tswei
(74) *Attorney, Agent, or Firm* — Fenwick & West LLP

(57) ABSTRACT

Embodiments relate to a client device receiving information on game objects for destruction in a gameplay session. The client device determines a level of destructive detail for the game objects based on performance data. The level of destructive detail corresponds to a number or configuration of shards for the game objects to destruct into. The client device retrieves graphics data for the game objects based on the determined level of destructive detail and renders a destruction of the game objects in the gameplay session using the retrieved graphics data.

14 Claims, 5 Drawing Sheets

(56) References Cited

U.S. PATENT DOCUMENTS

2017/0323211 A1* 11/2017 Bencke .............. G06Q 10/0633

OTHER PUBLICATIONS

The Japan Patent Office, Office Action, Japanese Patent Application No. 2020-003893, dated Dec. 9, 2020, six pages.
Unity. "Graphics Performance Optimization." Unity User Manual, Graphics Overview, 2018, 13 pages, [Online] [Retrieved Dec. 16, 2020], Retrieved from the Internet <URL:https://docs.unity3d.com/ja/2018.4/Manual/OptimizingGraphicsPerformance.html>.

* cited by examiner

DYNAMIC LEVELS OF DESTRUCTIVE DETAIL IN ELECTRONIC GAME DISPLAY

BACKGROUND

The present disclosure generally relates to electronic games, and in particular to rendering game objects in a session of an electronic game.

Many electronic games provide gameplay sessions, which are instances of gameplay. During gameplay sessions, many game objects are rendered, such as graphical elements representing terrain features. Often, during a gameplay session, game objects are "destroyed" in the course of gameplay, which may involve rendering a destruction of one or more game objects in the gameplay session, such as the shattering of a pane of glass. Rendering the destruction of game objects can involve the use of a large amount of computing resources, such as random access memory and processor cycles. Sometimes, destructions during gameplay can cause the gameplay session to request use of more computing resources than a client device running the electronic game can provide at that time. This may cause myriad issues, such as low frame rate, lag, or the crashing of the electronic game. Such issues may lead to undesirable gameplay experiences for users playing the electronic game on the client device.

SUMMARY

Embodiments relate to providing dynamic levels of destructive detail in a game object displayed in an electronic game. A client device receives information on game objects for destruction. The client device determines a level of destructive detail for the game objects based on performance data. The level of destructive detail corresponds to a number or configuration of shards for the game objects to destruct into. The client device retrieves graphics data for the game objects based on the determined level of destructive detail. The client device renders the destruction of the game objects using the retrieved graphics data.

In one or more embodiments, the level of destructive detail is selected from two or more levels of destructive detail, where each level of destructive detail defines a different number or configuration of shards for game objects to destruct into.

In one or more embodiments, retrieving the graphics data for the game objects based on the determined level of destructive detail involves the client device determining, for each game object, a set of shards for the game object corresponding to the determined level of destructive detail, and retrieving the graphics data of the determined set of shards. Each game object is associated with two or more sets of shards, where each set of shards for the game object corresponds to a different level of destructive detail and includes a different number or configuration of shards than other sets of shards for the game object.

In one or more embodiments, the performance data includes at least one of a frame rate, a number of active shards in the gameplay session, and a total number of shards loaded into a memory of the client device.

In one or more embodiments, determining the level of destructive detail for the game objects based on performance data includes the client device generating a score derived from the performance data and identifying a level of destructive detail based on the score as compared to one or more thresholds. Each threshold corresponds to a different level of destructive detail. In one or more embodiments, the one or more thresholds are based on performance capabilities of the client device.

In one or more embodiments, the client device maintains a predictive model for estimating performance of the client device, based on at least one of recent and scheduled game operations. The client device estimates performance of the client device based on the predictive model and further bases the determination of the level of destructive detail for the game objects on the estimated performance of the client device.

Figure 1:
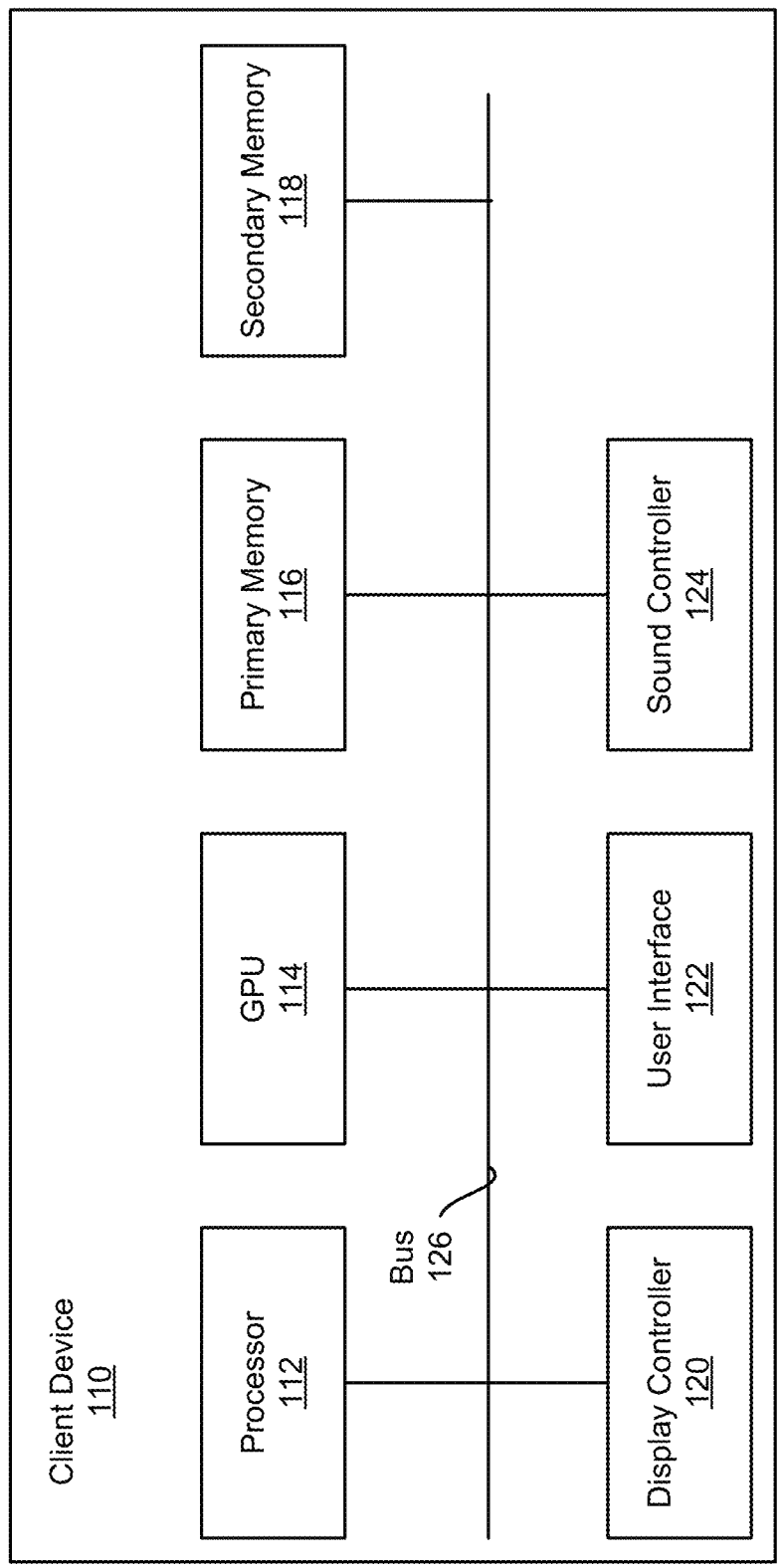
FIG. 1 is a block diagram of a client device, according to an embodiment.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to displaying of the destruction of game objects in a gameplay session. A gameplay session is an instance of gameplay of an electronic game upon a client device. Users may participate in a gameplay session via the client device. For example, the client device receives input from a user indicating a gameplay action within the gameplay session, such as to destroy a game object. The destruction of game objects may be initiated by factors other than received user input. For example, a game object may be destroyed based on actions by a non-player character (NPC) controlled by the electronic game, or based on scripted events included in the electronic game.

Game objects are data objects included in a gameplay session for display and/or interaction. For example, one game object may represent a building, and another game object may represent a tree. Rendered game objects may be rendered by processing polygon meshes.

The game objects may have a property of "destructibility" indicating whether the game object is destructible. Such "destructibility" of a game object may be represented by a binary value (e.g., "0" indicating indestructible, and "1" indicating destructible). A game object with a destructible property is destructed when a destructive action occurs upon the game object within a gameplay session including the game object. A game object with an indestructible property is not destructed when a destructive action occurs upon the game object within a gameplay session including the game object. The destructible game object may alternatively or additionally be associated with one or more levels of destructive detail available for the game object, such that determination of a level of destructive detail for the game object is constrained to the levels of destructible detail indicated by the destructible property. As such, certain game objects may not be rendered below a certain level of destructive detail, or, alternatively, above a certain level of destructive detail. The destructible property may be used to indicate that the game object is to always be rendered at a certain level of destructive detail.

After receiving information on game objects for destruction in a gameplay session, the client device determines a level of destructive detail for the game objects. The level of destructive detail may be based on performance data of the electronic game as run by the client device, and indicates a number and/or configuration of shards for the game objects to destruct into. The performance data may include a frame rate, a number of active shards in the gameplay session, and a total number of shards loaded in memory of the client device.

Shards are bodies representing a portion of a game object, rather than a complete game object. For example, the game object representing a building may be associated with a set of shards that, fitted together, take the shape of the cuboid polygon mesh representing the building. In an embodiment, the full polygon mesh of a game object is a shard, such as at a particular level of destructive detail, e.g., a lowest level of destructive detail.

Different levels of destructive detail correspond to different numbers and/or configurations of shards for game objects. For example, at a first level of destructive detail, a game object is associated with a first set of shards in a first configuration, and at a second level of destructive detail, the game object is associated with a second set of shards in a second configuration. The second level of destructive detail may be more detailed than the first level of destructive detail in that the second set of shards includes more shards than the first set of shards, such that upon a rendering of a destruction of the game object, the game object appears to break into a greater number of pieces. As a specific example, the game object may represent a building the first set of shards includes 1000 shards, and the second set of shards includes 100,000 shards. Upon rendering by the client device in the gameplay session the destruction of the game object, depending upon the level of destructive detail, the building appears to destruct into 1000 shards or 10,000 shards, the latter of which likely appears more visually realistic, but also consumes a greater amount of computing resources.

The electronic game may monitor the performance data and use it to generate a score. The electronic game may use the score to determine a level of destructive detail to use when rendering destruction in a gameplay session. The level of destructive detail may be periodically changed based on periodic generation of new scores, as the performance data changes dynamically as the electronic game is run by the client device. Based on each new score, the electronic game renders destruction of game objects at a particular level of destructive detail, such that the highest level of destructive detail can be employed at each time period that does not degrade performance past a threshold performance.

Among other advantages, dynamic determination of level of destructive detail enables the displaying of higher levels of destructive detail while preventing performance issues, such as low frame rate, lag, or crashing of the electronic game. Thus, dynamic determination of level of destructive detail improves performance of the client device and enhances user experience of the game.

Embodiments are described herein with reference to the figures where like reference numbers indicate identical or functionally similar elements. Also in the figures, the left most digit or digits of each reference number corresponds to the figure in which the reference number is first used.

FIG. 1 is a block diagram of a client device 110 in which the techniques described herein may be practiced, according to an embodiment. The client device 110 is any machine capable of executing instructions, and may be a standalone device or a connected (e.g., networked) set of devices, and may be a computing device such as a gaming system, a personal computer, a mobile phone, a tablet, or so on. The client device 110 includes a processor (CPU) 112, a graphics processing unit (GPU) 114, a primary memory 116, a secondary memory 118, a display controller 120, a user interface 122, a sound controller 124, and a bus 126. In other embodiments the client device 110 may include additional or other components. While only a single client device 140 is illustrated, other embodiments may include any collection of client devices 140 that individually or jointly execute instructions to perform any one or more of the methodologies discussed herein.

The primary memory 116 is a machine-readable medium that stores instructions (e.g., software) embodying any one or more of the methodologies or functions described herein. For example, the primary memory 116 may store instructions that, when executed by the CPU 112, configure the CPU 112 to perform a process, described below in detail with reference to FIG. 5. Instructions may also reside, partially or completely, within the CPU 112 and/or GPU 114, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 118 is a memory separate from the primary memory 116. Similar to the primary memory 116, the secondary memory 118 is a machine-readable medium that stores instructions (e.g., software) embodying any one or more of the methodologies or functions described herein. For example, the primary memory 116 may be a hard drive of the client device 110, and the secondary memory 118 may be a game disc for an electronic game. As a specific example, the primary memory 116 may store a game system 200 that uses data stored on the secondary memory 118. Primary memory 116 and secondary memory 118 are described in greater detail with reference to FIG. 2 below.

The CPU 112 is processing circuitry configured to carry out the instructions stored in the primary memory 116 and/or secondary memory 118. The CPU 112 may be a general-purpose or embedded processor using any of a variety of instruction set architectures (ISAs). Although a single CPU is illustrated in FIG. 1, the client device 110 may include multiple CPUs 112. In multiprocessor systems, each of the CPUs 112 may commonly, but not necessarily, implement the same ISA.

The GPU 114 is a processing circuit specifically designed for efficient processing of graphical images. The GPU 114 may render objects to be displayed into a frame buffer (e.g., one that includes pixel data for an entire frame) based on instructions from the CPU 112. The GPU 114 may include one or more graphics processors that may execute graphics software to perform a part or all of the graphics operations.

The display controller 120 is a circuit that generates a video signal using graphical data from the GPU 114. For example, the display controller 120 drives a display device (e.g., a liquid crystal display (LCD) and a projector). As such, an electronic game can be displayed as images or a video sequence through the display controller 120.

The sound controller 124 is a circuit that provides input and output of audio signals to and from the client device 110. For purposes of the destruction of game objects, the sound controller 124 can provide audio signals that align with the destruction.

The user interface 122 is hardware, software, firmware, or a combination thereof that enables a user to interact with the client device 110. The user interface 122 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a gameplay session that includes game objects rendered by the client device 110. The gameplay session includes a simulation and rendering of game objects, within which the user's game character operates. For example, the user's game character may destroy game objects during the gameplay session.

The client device 110 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into memory and executed by the CPU 112 or the GPU 114. For example, program instructions for the process of FIG. 5 can be loaded into the primary memory 116 and/or secondary memory 118, and executed by the CPU 112 and GPU 114.

Figure 2:
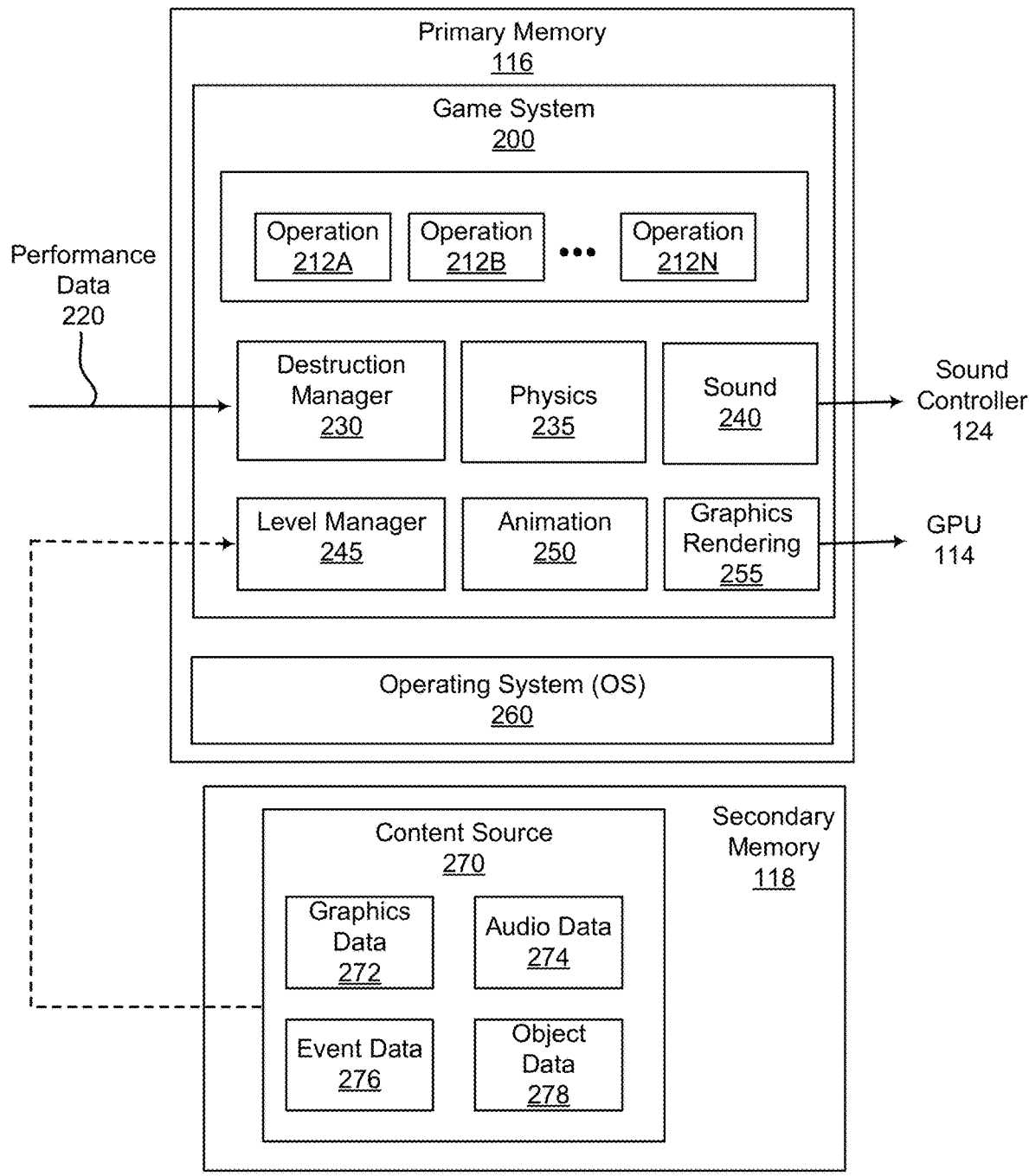
FIG. 2 is a block diagram of software modules in a memory of the client device of FIG. 1, according to an embodiment.

FIG. 2 is a block diagram of software modules in a memory of the client device 110 of FIG. 1, according to an embodiment. In particular, FIG. 2 illustrates software modules in the primary memory 116 and the secondary memory 118 of the client device 110. The primary memory 116 may store, among other modules, a game system 200 and an operating system ("OS") 260. The secondary memory 118 may store, among other modules, a content source 270. The primary memory 116 and secondary memory 118 may include other modules not illustrated in FIG. 2. Furthermore, in other embodiments, the primary memory 116 and secondary memory 118 may each store software modules and data represented herein as stored in the other.

The game system 200 includes a destruction manager 230, a physics system 235, a sound module 240, a level manager 245, an animation system 250, and a graphics rendering module 255. These modules collectively form a "game engine" of the game system 200. The electronic game includes at least the game system 200, and may additionally include data stored at the secondary memory 118 in some embodiments.

The game system 200 performs operations 212A through 212N (collectively referred to as "the operations 212") to run gameplay sessions of the electronic game, including the destruction of game objects. Specifically, the game system 200 performs these operations 212 to instantiate game objects in the gameplay session, render various instantiated game objects within the gameplay session (e.g., the user's game character and game objects in a particular direction or field of view from the game character), and simulate interactions between the game objects. The operations 212 refer to computing operations that result in changes in various parameters (e.g., states of game objects and user status) based upon certain events (e.g., user interactions, expirations of time, and triggers occurring in the gameplay session).

Some operations 212 are associated with one or more game objects. Examples of operations include a rendering a game object, including animations of movement of the game object, portions of the game object, and/or interactions of the game object with another game object. Particular examples may include a character running, fluid flowing, an arrow flying, a door opening, a sand castle collapsing, and so on. While some operations 212 have relatively simple responses (e.g., the door opening), other operations may need to be simulated by the physics system 235 (e.g., the sand castle collapsing). When executing the operations 212, the game system 200 may communicate with the components of the game engine (e.g., physics system 235) through application programming interfaces (APIs). At least one of these operations 212 involves determining a level of destructive detail for a gameplay session.

The level manager 245 creates and maintains gameplay sessions using game objects it retrieves from the primary memory 116 and/or secondary memory 118. Other modules of the game system 200 can request one or more game objects from the level manager 245, which responds to the requests by sending the game objects to the module of the game system 200 that sent the request. The level manager 245 may also receive input from the user interface 122, the operations 212, and/or other modules of the game system 200, which may impact a game session, e.g., instruct the level manager 245 to destroy a game object.

The destruction manager 230 dynamically handles the destruction of game objects within a gameplay session. Periodically, the destruction manager 230 determines a performance score based on performance data of the gameplay session, and selects a level of destructive detail to use for destruction of game objects within the gameplay session based on the score. In an embodiment, the destruction manager 230 selects the highest level of destructive detail possible based on the performance score. For example, three levels of destructive detail may correspond to a first threshold between a lowest level of destructive detail and a middle level of destructive detail, and a second threshold between the middle level of destructive detail and a high level of destructive detail. For a performance score between the first and second thresholds, the destruction manager 230 selects the middle level of destructive detail rather than the low level of destructive detail. For a performance score above the second threshold, the destruction manager 230 uses the high level of destructive detail rather than the middle or low levels of destructive detail. In both cases, the destruction manager 230 reacts to additional constraints, e.g., a destructible component of a game object indicating that the game object shall only be rendered at the middle level of destructive detail.

The destruction manager 230 determines the performance score for a gameplay session based on one or more metrics, which are reflected in the "performance data" referenced herein. The performance data may be computed from, among others, (i) a first metric representing a current frame rate of the client device 110, (ii) a second metric representing a number of active shards in the gameplay session, and (iii) a third metric representing a total number of shards in memory of the client device 110, e.g., in primary memory 116. The number of active shards in the gameplay session is the number of shards rendered in the gameplay session at the time the performance data is gathered, and may vary throughout gameplay depending upon how many, if any, game objects are destroyed at that time. In contrast, the total number of shards in memory of the client device 110 may be set when the gameplay session is launched, and remain static throughout the gameplay session.

The performance score is determined by the destruction manager 230 by weighing each metric and combining the weighted metrics into a single value. In one embodiment, the performance score is determined by:

$$\frac{w_1}{\text{Frame Rate}} + w_2 \times (\text{Shard Count}) + w_3 \times (\text{Total Shards}) \quad \text{Equation (1)}$$

where Frame Rate is the frame rate, Shard Count is the number of active shards in the gameplay session, Total Shards is the total number of shards in memory of the client device 110, and $w_1$ through $w_3$ are the first through third weights, respectively. In other embodiments, other formulas may be used when determining a performance score, and may involve different metrics than those described herein, as well as more or fewer than three metrics.

In an embodiment, the weights are preset values. In another embodiment, one or more of the weights are based on specifications of the client device 110, e.g., an amount of primary memory 116 the client device 110 has. For example, $w_3$ may be inversely proportional to a measurement of the amount of primary memory 116, as greater memory capacity reduces the potential impact of a high total number of shards. Alternatively, in some embodiments, one or more thresholds may be based on the specifications of the client device 110, such that increased computing resources (e.g., primary memory 116 or processor speed) correlates with lower thresholds.

After determining a performance score, the destruction manager 230 compares the performance score to one or more thresholds and selects a level of destructive detail based on the comparison, e.g., which, if any, thresholds are surpassed by the performance score. The destruction manager 230 selects the highest level of destructive detail allowed based on the performance score. After selection of a level of destructive detail, the destruction manager 230 instructs the game system 200 to render the destruction of game objects at the selected level of destructive detail. The game system 200 does so until the destruction manager 230 selects a new level of destructive detail and instructs the game system 200 to change the level of destructive detail it is actively using to the newly selected level of destructive detail. Upon a change from one level of destructive detail to another, the game system 200 either immediately changes all subsequent destruction renderings from the one level of destructive detail to the other, or uses a gradual switch from the one to the other. If the game system 200 uses a gradual switch, the destruction manager 230 may indicate various subsets of game objects in a particular order, such that one subset of game objects at a time is switched from the one level of destructive detail to the other. In this manner, the switch may be less visually jarring, and also require fewer computing resources at any one time, due to fewer game objects switching at the same time.

In an embodiment, the destruction manager 230 tracks a rate of active shard creation and adjusts the level of destructive detail based on the tracked rate. The rate of active shard creation may be based on a number of active shards added to the gameplay session over a period of time, e.g., each second. The tracked rate may alternatively be a predicted rate of active shard creation, which may be based upon the inclusion of particular game objects in the gameplay session, particular impending game events in the gameplay session, and so on. In one embodiment, if the tracked rate is greater than a threshold rate, the destruction manager 230 lowers the level of destructive detail by one or more levels. In other embodiments, the tracked rate may be used to alter the weights involved in determining performance scores, such that higher tracked rates cause lower scores, decreasing the likelihood of a high level of destructive detail. By factoring for the rate of active shard creation, the destruction manager 230 can better account for changes in computing resources used by the game system 200 and thereby reduce performance issues.

In an embodiment, the destruction manager 230 maintains a predictive model for estimating performance of the client device 110 based on recent and/or scheduled game operations 212. Using the predictive model, the destruction manager 230 estimates future performance of the client device 110, e.g., at the runtime of the scheduled operations 212. The destruction manager 230 may adjust the performance score based on the estimate produced using the predictive model. For example, based on the estimate, the destruction manager 230 may change one or more weights, the performance score itself, one or more thresholds, or the level of destructive detail.

The physics system 235 models and simulates the dynamics of game objects in the gameplay session. After an operation 212 is initiated in the game system 200, the physics system 235 models how the action affects the game object associated with the operation 212. For example, the physics system models a rock as it rolls down a hill. Depending on the action and game object, other game objects and actions may become associated with the action or game object. For example, a thrown rock may knock over another game object. This may trigger a new operation 212 where the game object is hit by the rock. The physics system 235 uses the level of destructive detail determined by the destruction manager 230 when modeling and simulating the dynamics of the destruction of game objects in the gameplay session. For example, the physics system 235 may determine how to destroy a game object based on the set of shards associated with the game object at the determined level of destructive detail.

The animation system 250 is a module that performs kinematic animation of game objects in the gameplay session based on the operations 212 from the game system 200. For example, if an operation 212 specifies that a robotic arm is moving, the animation system animates the kinematics of the arm movement. As a second example, if an operation 212 specifies that a building is exploding, the animation system animates the physics of the explosion, as determined by the physics system 235. The animation system 250 may include any number of specialized modules which perform specific animation tasks. In an embodiment, the animation system 250 factors for the level of destructive detail when animating actions in the gameplay session.

The sound module 240 generates sounds corresponding to actions occurring in the gameplay session. For example, the destruction of a "building" game object may correspond to an "explosion" sound. Animation data from the animation system 250 or gameplay session information from the level manager 245 may be sent to the sound module 240 to enable the sound module 240 to produce sound. The sound module 240 sends sound data to the sound controller 124.

The graphics rendering module 255 renders graphics from the animation system 250 and level manager 245 to generate an image of the gameplay session. For example, the graphics rendering module 255 receives a scene file from the animation system 250 and a game object from the level manager 245. The graphics rendering module 255 sends graphical data to the GPU 114 to render images on a display, e.g., a display of the client device 110 or a display connected to the client device 110, via the display controller 120.

The OS 260 manages computer hardware and software resources. Specifically, the OS 260 acts as an intermediary between programs and the computer hardware. For example, the OS 260 can perform basic tasks, such as recognizing input from the user interface 122 and sending output to the display controller 120.

The content source 270 in the secondary memory 118 includes various data, including graphics data 272, audio data 274, event data 276, and object data 278. Depending upon the embodiment, some or all of the data in the content source 270 may instead be in the primary memory 116. The content source 270 sends data to the level manager 245 upon receiving a request for the data from the level manager 245. For example, upon the level manager 245 receiving a request for information regarding graphics data from the destruction manager 230, the level manager 245 requests the information from the content source 270, which sends the information to the level manager 245.

The graphics data 272 includes graphics data, e.g., polygon meshes and one or more sets of shards, for one or more game objects. As described in greater detail below with reference to FIG. 3, each game object is associated with one or more sets of shards, and each set of shards for a game object is associated with a different level of destructive detail.

The audio data 274 includes data relating to sound, e.g., clips of sound. Each portion of audio data 274 may be associated with one or more game objects. The sound module 240 may retrieve audio data 274 and use it to generate sounds corresponding to actions occurring in the gameplay session, such as the destruction of a game object.

The event data 276 includes game events, which occur during the gameplay session. Each game event may be associated with a destruction operation for one or more game objects. A destruction operation may be triggered by the occurrence of an associated game event in the gameplay session.

The object data 278 includes game objects. Each game object may include a variety of information depending upon the embodiment. This may include an identifier used to associate a game object with a polygon mesh and one or more sets of shards. In an embodiment, the object data 278 includes the graphics data 272.

Figure 3:
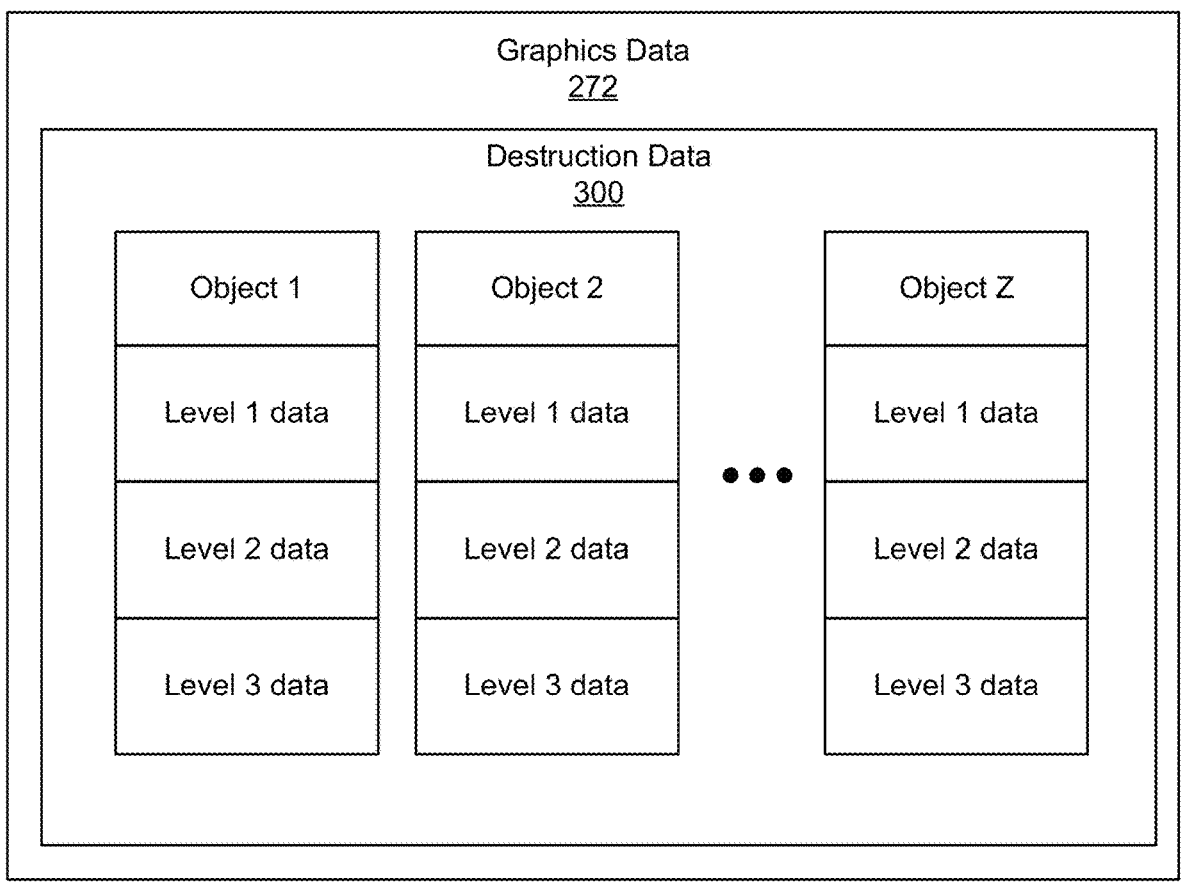
FIG. 3 is a block diagram of graphics data used by software modules in memory of the client device of FIG. 1, according to an embodiment.

FIG. 3 is a block diagram of the graphics data 272 used by the software modules in the memory of the client device of FIG. 1, according to an embodiment. The graphics data 272 includes destruction data 300, which defines sets of shards for game objects. Each game object is associated with one or more sets of shards, each corresponding to a different level of destructive detail. In an embodiment, there are three levels of destructive detail. A first level of destructive detail ("Level 1") is the lowest level of detail with the fewest shards, a second level of destructive detail ("Level 2") is the middle level of detail with a middle amount of shards, and a third level of destructive detail ("Level 3") is the highest level of detail with the greatest number of shards.

Different game objects may have different sets of shards including different numbers and/or configurations of shards. For example, a first game object (Object 1) and a second game object (Object 2) are each associated with three sets of shards. For each object, Level 1 data is a set of shards corresponding to Level 1, Level 2 data is a set of shards corresponding to Level 2, and Level 3 data is a set of shards corresponding to Level 3. For example, Object 1's Level 1 data may include 100 shards, while Object 2's Level 1 data may include 110 shards. Object 1's Level 2 data and Object 2's Level 2 data may both include 1000 shards, but have different configurations—e.g., if Object 1 represents a building and Object 2 represents a mountain, then Object 1's Level 2 data may fit together into a cuboid, whereas Object 2's Level 2 data may fit together into a pyramidoid. Object 1's Level 3 data may include 10,000 shards and Object 2's Level 3 data may include 10,110 shards. In an embodiment, each shard at a greater level of detail represents a portion of a shard at a lower level of detail—e.g., each shard in Object 1's Level 3 data is a portion of a shard from Object 1's Level 2 data.

The game system 200 does not dynamically determine the sets of shards, but rather uses premade sets of shards included in the destruction data 300. Upon the game system 200 launching a gameplay session, the game system 200 determines which game objects are or could be involved in the gameplay session, and loads them into primary memory 116, e.g., at the level manager 245. In an embodiment, performance data for a gameplay session, specifically the total number of shards kept in memory, is based upon the total number of shards loaded into the primary memory 116 for the gameplay session.

Although FIG. 3 describes using three different levels of destructive detail, this is merely illustrative. More than three levels of destructive detail or only two levels of destructive detail may also be used.

Figure 4A:
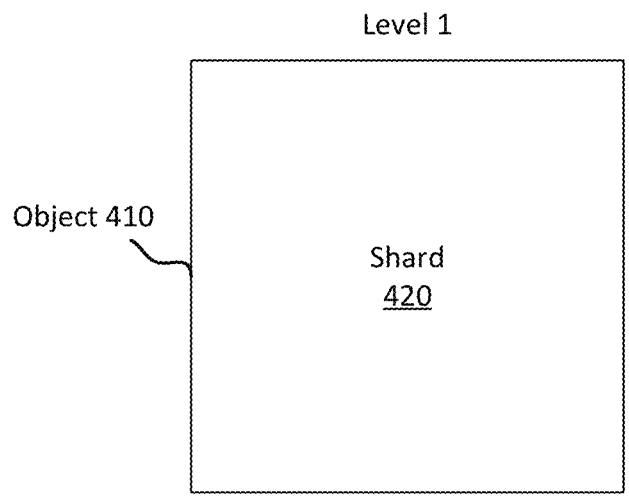
FIGS. 4A through 4C illustrate shards in different levels of destructive details for the same game object, according to an embodiment.
Figure 4B:
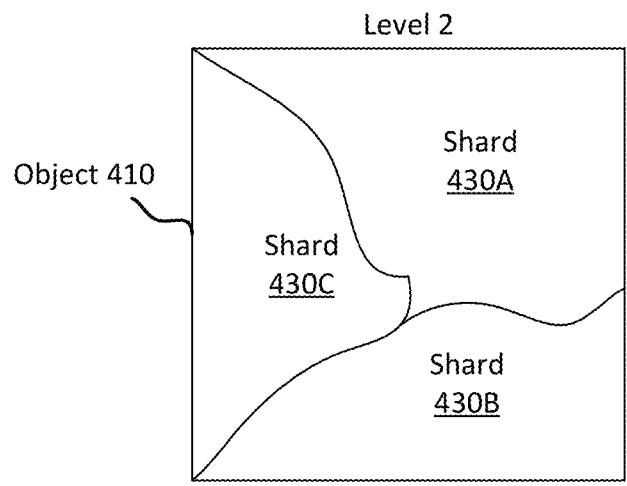
Figure 4C:
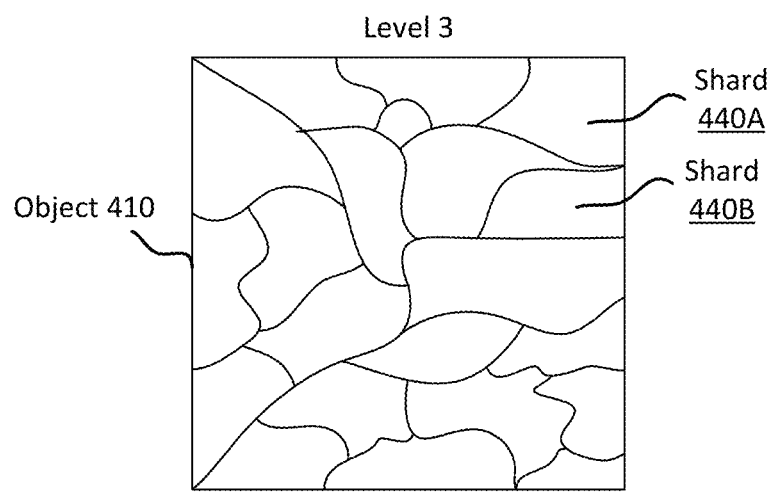

FIGS. 4A through 4C illustrate shards in different levels of destructive details for the same game object, according to an embodiment. FIG. 4A illustrates the destruction data 300 of a game object, Object 410, at Level 1. At this level, the destruction data 300 for the game object—the set of shards for the Object 410—includes a single shard 420. This shard 420 may be the polygon mesh representing the undestroyed Object 410, and destruction of Object 410 may involve a removal of Shard 420 from the gameplay session, e.g., the client device ceases rendering the shard 420.

FIG. 4B illustrates the destruction data of Object 410 at Level 2. At this level, the destruction data 300 includes three shards 430, where each shard 430 is a portion of the shard 420, together representing the full Object 410 graphically represented by shard 420. Destruction of Object 410 at Level 2 may therefore involve the shards 430 falling apart. For example, the Object's 410 destruction within a game session may involve splitting into the three shards 430, each landing in a different location.

FIG. 4C illustrates the destruction data of Object 410 at Level 3. At this level, the destruction data 300 includes 21 shards, including shards 440A-B. Each shard at this level is a portion of a shard at Level 2. For example, shards 440A-B are both portions of shard 430A. Destruction of Object 410 at Level 3 may involve the 21 shards falling apart, in a more detailed and complex manner than the three shards 430 at Level 2. For example, if the Object 410 is a window, and its destruction is a rock breaking through the window, at Level 2, the destruction may be the rock breaking the window into three pieces, whereas at Level 3, the destruction may be the rock shattering the window into 21 pieces.

Figure 5:
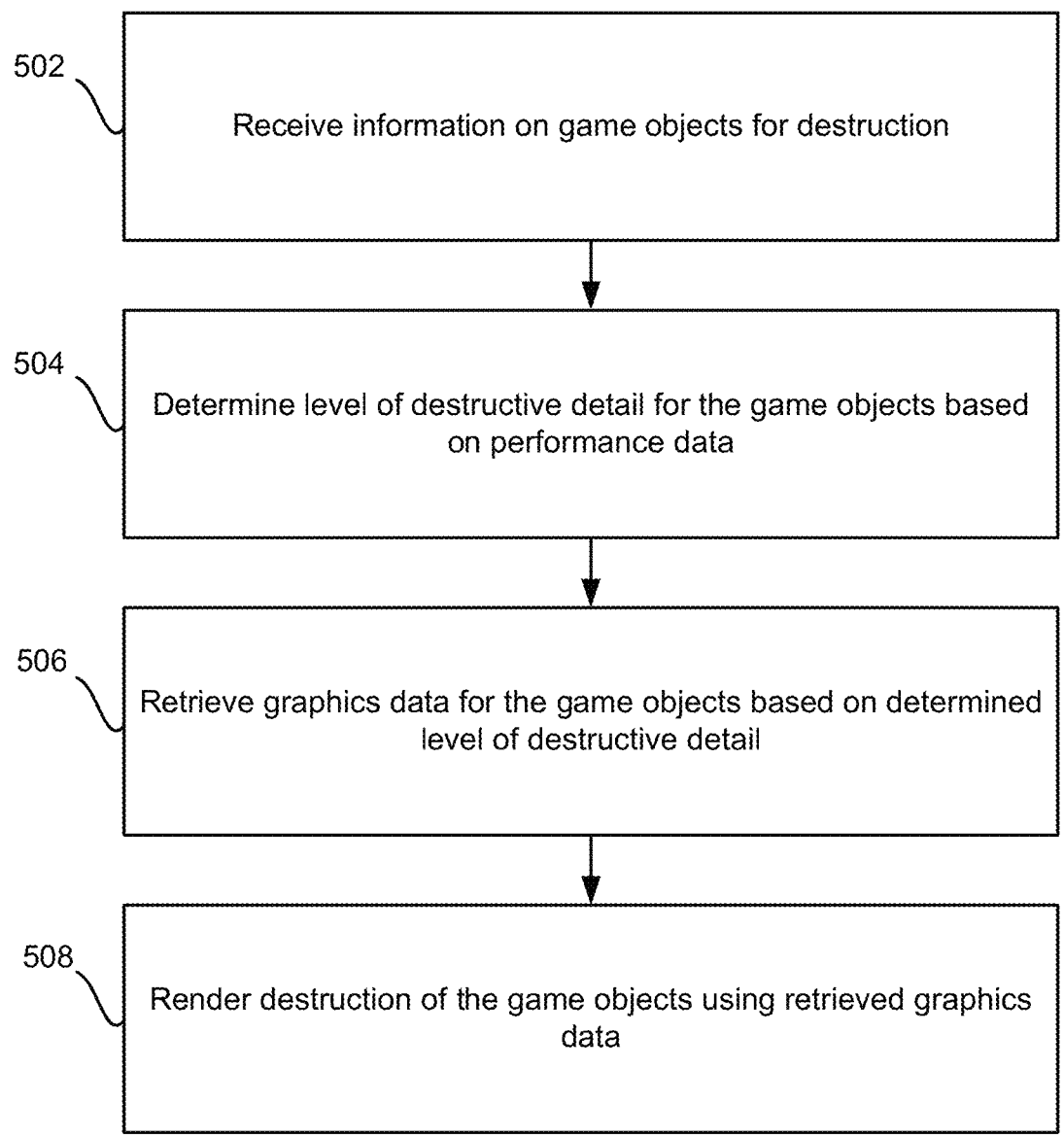
FIG. 5 is a flowchart illustrating a process for providing dynamic levels of destructive detail in a game object, according to an embodiment.

FIG. 5 is a flowchart illustrating a process for implementing the techniques described herein, according to an embodiment. The client device 110 receives 502 information on game objects for destruction. The information may be a set of game objects or references to game objects that the client device 110 is to render the destruction of within a gameplay session running upon the client device 110.

The client device 110 determines 504 a level of destructive detail for the game objects based on performance data. The level of destructive detail corresponds to a number or configuration of shards for the game objects to destruct into. The performance data is one or more metrics tracking computing performance of the client device 110. The level of destructive detail may further be based on a predictive model estimating performance of the client device or on a rate of active shard creation, depending upon the embodiment.

The client device 110 retrieves 506 graphics data for the game objects based on the determined level of destructive detail. For example, for each game object to be destructed, the client device 110 retrieves a set of shards corresponding to the level of destructive detail. The set of shards may be stored in primary memory 116 and/or secondary memory 118 of the client device 110.

The client device 110 renders 508 the destruction of the game objects using the retrieved graphics data. For example, the client device 110 renders 508 each game object for destruction as breaking into the set of shards retrieved for the game object.

In an embodiment, the level of destructive detail is one of two or more levels of destructive detail, and each level of destructive detail defines a different number or configuration of shards for game objects to destruct into.

In an embodiment, retrieving the graphics data for the game objects based on the determined level of destructive detail involves the client device 110 determining, for each game object, a set of shards for the game object corresponding to the determined level of destructive detail, and retrieving the graphics data of the determined set of shards. Each game object is associated with two or more sets of shards, where each set of shards for the game object corresponds to a different level of destructive detail and includes a different number or configuration of shards than other sets of shards for the game object.

In an embodiment, the performance data includes at least one of a frame rate, a number of active shards in the gameplay session, and a total number of shards loaded into a memory of the client device.

In an embodiment, determining the level of destructive detail for the game objects based on performance data includes the client device 110 generating a score derived from the performance data and identifying a level of destructive detail based on the score as compared to one or more thresholds. Each threshold corresponds to a different level of destructive detail. In an embodiment, the one or more thresholds are based on performance capabilities of the client device 110.

In an embodiment, the client device 110 maintains a predictive model for estimating performance of the client device, based on at least one of recent and scheduled game operations. The client device 110 estimates performance of the client device based on the predictive model and further bases the determination of the level of destructive detail for the game objects on the estimated performance of the client device.

Although embodiments described above are explained primarily in reference to a game system, the embodiments may be applied to other applications such as engineering software, navigational software, and educational software, such as a map application or a ride hailing application. Additionally, embodiments can be applied to research applications.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
receiving, at a client device, information on game objects for destruction in a gameplay session;
determining, by the client device, a level of destructive detail for the game objects based on performance data, wherein the level of destructive detail is one of two or more levels of destructive detail, each level of destructive detail defining a different number or configuration of shards for the game objects to destruct into;
retrieving, by the client device, the shards that correspond to the determined level of destructive detail for the game objects, comprising:
for each game object, determining, by the client device, a set of shards for the game object corresponding to the determined level of destructive detail, wherein each shard in the set of shards is a graphical element, each game object associated with two or more sets of shards, each set of shards for each game object corresponding to a different level of destructive detail and including a different number or configuration of shards than other sets of shards for the game object; and
retrieving, by the client device, the graphics data of the determined set of shards; and
rendering, by the client device, a destruction of the game objects into the retrieved shards in the gameplay session.

2. The method of claim 1, wherein the performance data comprises at least one of a frame rate, a number of active shards in the gameplay session, and a total number of shards loaded into a memory of the client device.

3. The method of claim 1, wherein determining the level of destructive detail for the game objects based on performance data comprises:
generating, by the client device, a score derived from the performance data, and
identifying, by the client device, a level of destructive detail based on the score as compared to one or more thresholds, wherein each threshold corresponds to a different level of destructive detail.

4. The method of claim 3, wherein the one or more thresholds are based on performance capabilities of the client device.

5. The method of claim 1, further comprising:
maintaining, by the client device, a predictive model for estimating performance of the client device based on at least one of recent and scheduled game operations, and
estimating, by the client device, performance of the client device, based on the predictive model,
wherein determining the level of destructive detail for the game objects is further based on the estimated performance of the client device.

6. A non-transitory computer-readable storage medium storing computer program instructions executable by a processor to perform operations, the operations comprising:
receiving, at a client device, information on game objects for destruction in a gameplay session;
determining, by the client device, a level of destructive detail for the game objects based on performance data, wherein the level of destructive detail is one of two or more levels of destructive detail, each level of destructive detail defining a different number or configuration of shards for the game objects to destruct into;
retrieving, by the client device, the shards that correspond to the determined level of destructive detail for the game objects, comprising:
for each game object, determining, by the client device, a set of shards for the game object corresponding to the determined level of destructive detail, wherein each shard in the set of shards is a graphical element, each game object associated with two or more sets of shards, each set of shards for each game object corresponding to a different level of destructive detail and including a different number or configuration of shards than other sets of shards for the game object; and
retrieving, by the client device, the graphics data of the determined set of shards; and
rendering, by the client device, a destruction of the game objects into the retrieved shards in the gameplay session.

7. The non-transitory computer-readable storage medium of claim 6, wherein the performance data comprises at least one of a frame rate, a number of active shards in the gameplay session, and a total number of shards loaded into a memory of the client device.

8. The non-transitory computer-readable storage medium of claim 6, wherein determining the level of destructive detail for the game objects based on performance data comprises:
generating, by the client device, a score derived from the performance data, and
identifying, by the client device, a level of destructive detail based on the score as compared to one or more thresholds, wherein each threshold corresponds to a different level of destructive detail.

9. The non-transitory computer-readable storage medium of claim 8, wherein the one or more thresholds are based on performance capabilities of the client device.

10. The non-transitory computer-readable storage medium of claim 6, the operations further comprising:
maintaining, by the client device, a predictive model for estimating performance of the client device based on at least one of recent and scheduled game operations, and
estimating, by the client device, performance of the client device, based on the predictive model,
wherein determining the level of destructive detail for the game objects is further based on the estimated performance of the client device.

11. A system, comprising:
a processor for executing computer program instructions; and
a non-transitory computer-readable storage medium storing computer program instructions executable by the processor to perform operations, the operations comprising:
receiving, at a client device, information on game objects for destruction in a gameplay session;
determining, by the client device, a level of destructive detail for the game objects based on performance data, wherein the level of destructive detail is one of two or more levels of destructive detail, each level of destructive detail defining a different number or configuration of shards for the game objects to destruct into;
retrieving, by the client device, the shards that correspond to the determined level of destructive detail for the game objects, comprising:
for each game object, determining, by the client device, a set of shards for the game object corresponding to the determined level of destructive detail, wherein each shard in the set of shards is a graphical element, each game object associated with two or more sets of shards, each set of shards for each game object corresponding to a different level of destructive detail and including a different number or configuration of shards than other sets of shards for the game object; and
retrieving, by the client device, the graphics data of the determined set of shards; and
rendering, by the client device, a destruction of the game objects into the retrieved shards in the gameplay session.

12. The system of claim 11, wherein determining the level of destructive detail for the game objects based on performance data comprises:
generating, by the client device, a score derived from the performance data, and
identifying, by the client device, a level of destructive detail based on the score as compared to one or more thresholds, wherein each threshold corresponds to a different level of destructive detail.

13. The system of claim 12, wherein the one or more thresholds are based on performance capabilities of the client device.

14. The system of claim 11, the operations further comprising:
maintaining, by the client device, a predictive model for estimating performance of the client device based on at least one of recent and scheduled game operations, and
estimating, by the client device, performance of the client device, based on the predictive model,
wherein determining the level of destructive detail for the game objects is further based on the estimated performance of the client device.

* * * * *